United States Patent [19]

Barrett, Jr.

[11] Patent Number: 4,481,269

[45] Date of Patent: Nov. 6, 1984

[54] BATTERY CELL COVERS WITH SNAP-ON CABLE RETAINERS

[76] Inventor: James H. Barrett, Jr., 5055 Gold Creed Rd., Sylvania, Ohio 43560

[21] Appl. No.: 497,603

[22] Filed: May 23, 1983

[51] Int. Cl.$^3$ ............................................. H01M 2/10
[52] U.S. Cl. ................................. 429/121; 248/74.1
[58] Field of Search ..................... 429/121, 122, 123; 248/74.1, 73, 71, 72

[56] References Cited

U.S. PATENT DOCUMENTS

| | | |
|---|---|---|
| 1,510,184 | 10/1921 | Manning . |
| 1,611,908 | 12/1926 | Harley et al. . |
| 1,981,973 | 11/1934 | Tinnerman ........................... 248/73 |
| 1,995,370 | 3/1935 | Walters ............................. 248/73 X |
| 2,169,708 | 8/1939 | O'Callaghan ......................... 24/213 |
| 2,235,062 | 3/1941 | Bak .................................. 173/259 |
| 2,578,191 | 12/1951 | Longaker ............................. 136/135 |
| 2,613,051 | 10/1952 | Baum ................................. 248/50 |
| 2,785,453 | 3/1957 | Wentz ................................ 24/217 |
| 2,889,451 | 6/1959 | Longo ................................ 240/52 |
| 3,118,644 | 1/1964 | Wernig ............................... 248/73 |
| 3,154,281 | 10/1964 | Frank ................................ 248/201 |
| 3,163,712 | 12/1964 | Cochran .............................. 248/74.5 |
| 3,262,663 | 7/1966 | Jansson .............................. 248/74 |
| 3,330,518 | 7/1967 | Adler ................................ 248/223 |
| 3,417,438 | 12/1968 | Schuplin ........................... 248/73 X |
| 3,471,109 | 10/1969 | Meyer ................................ 248/68 |
| 3,523,669 | 8/1970 | Avallone ............................. 248/73 |
| 3,540,687 | 11/1970 | Cuva ................................. 248/316 |
| 3,582,030 | 6/1971 | Barrett, Jr. ......................... 248/74 |
| 3,631,572 | 1/1972 | Lange ................................ 24/223 |
| 3,684,229 | 8/1972 | Peter et al. ......................... 248/223 |
| 3,756,637 | 9/1973 | Wildi ................................ 287/189 |
| 3,807,675 | 4/1974 | Sockerson et al. ..................... 248/73 |
| 3,894,706 | 7/1975 | Mizusawa .......................... 248/68 CB |
| 3,991,960 | 11/1976 | Tanaka ............................. 248/68 R |
| 4,023,758 | 5/1977 | Yuda ................................. 248/73 |
| 4,061,299 | 12/1977 | Kurosaki ............................. 248/73 |
| 4,119,285 | 10/1978 | Bisping et al. ....................... 248/72 |
| 4,131,258 | 12/1978 | Okuda et al. ......................... 248/73 |
| 4,225,103 | 9/1980 | Pate ............................... 248/74 B |
| 4,229,686 | 10/1980 | Mullersman et al. .................... 320/2 |

Primary Examiner—Anthony Skapars
Attorney, Agent, or Firm—Hugh Adam Kirk

[57] ABSTRACT

The disclosure concerns a plurality of adjacent rectangular secondary battery cell covers having either identical symmetrically located narrow-necked sockets in each corner or inverte4d flared-top pins symmetrically located in each corner, and corresponding flexible plastic cable retainers having a pair of spaced cooperating enlarged-headed pins or narrow-necked sockets, respectively, on their bottoms. These pins or sockets on the retainers are spaced equally to the spacing between the sockets or pins, respectively, on adjacent corners of said covers, so that the cable retainers snap into place and bridge the tops of the walls of adjacent battery cells. The cable retainers have continuous or slit loops for holding one or a pair of battery cables along and between the tops of the battery cells.

5 Claims, 10 Drawing Figures

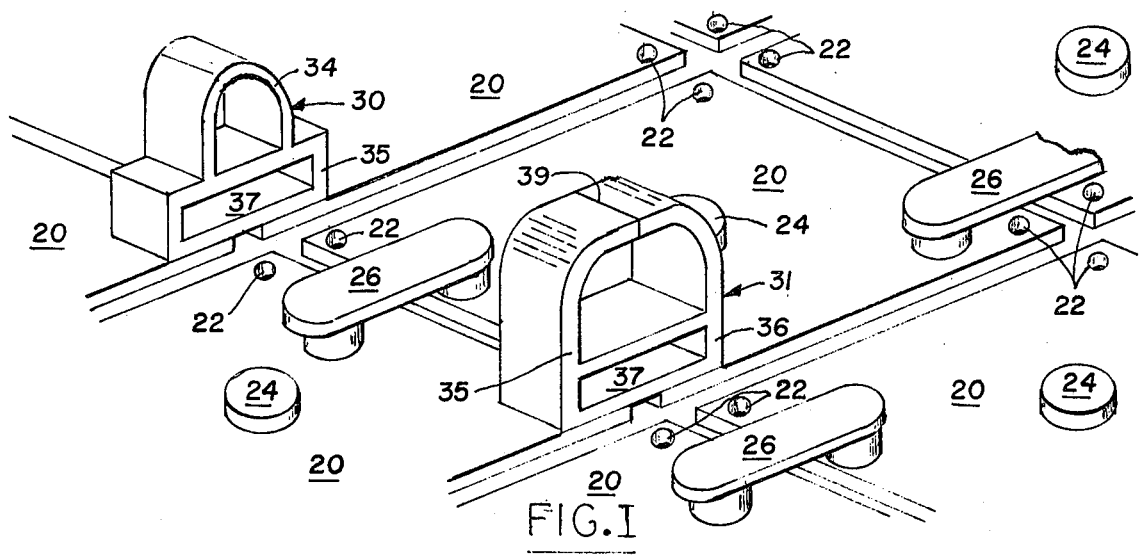
FIG. I
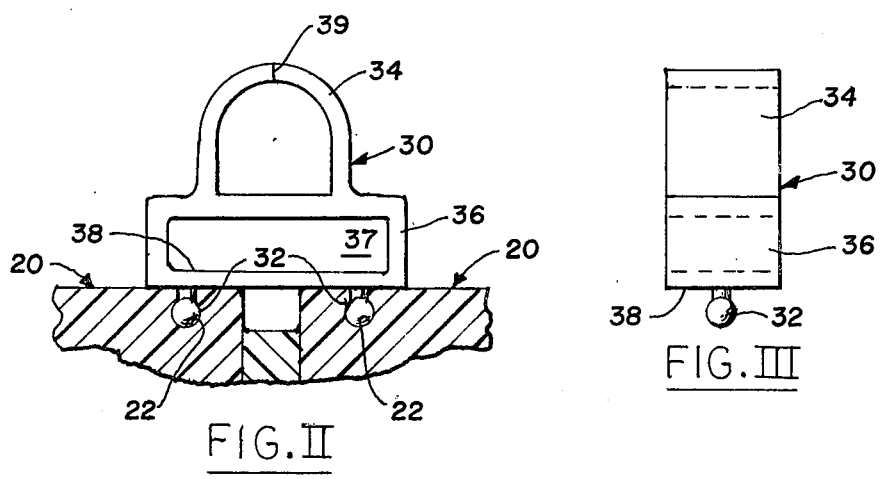
FIG. II  FIG. III
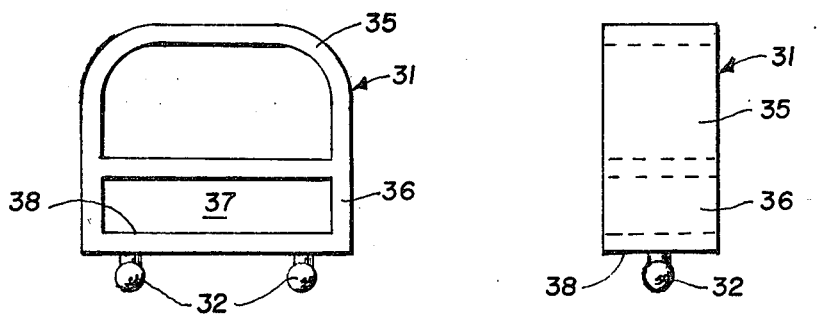
FIG. IV  FIG. V

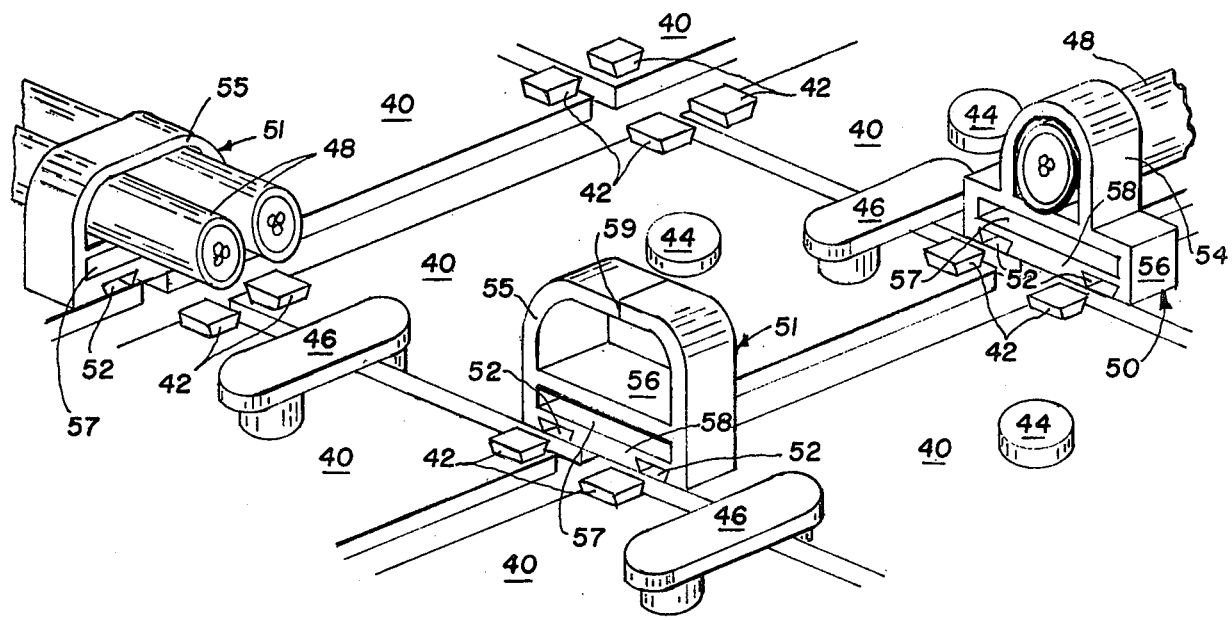
FIG. VI
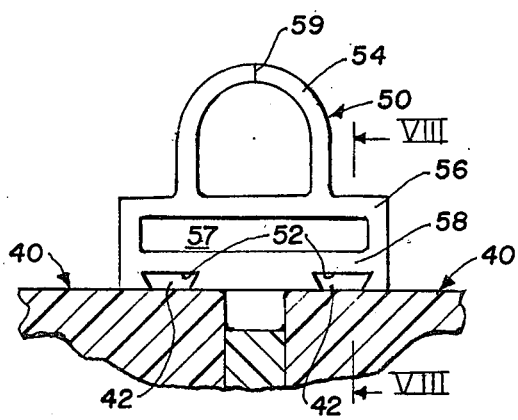
FIG. VII
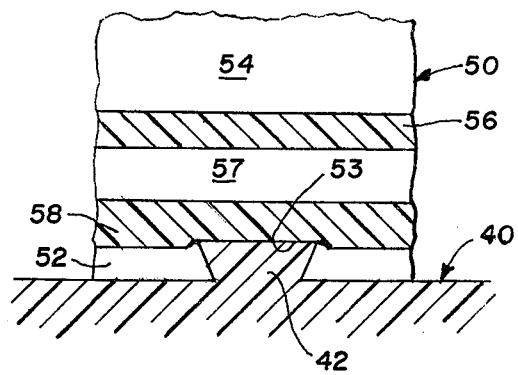
FIG. VIII
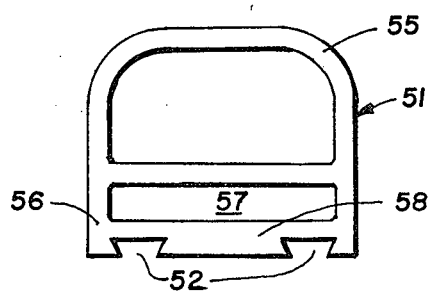
FIG. IX
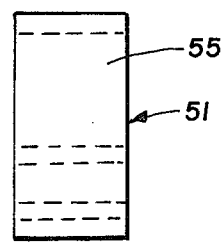
FIG. X

BATTERY CELL COVERS WITH SNAP-ON CABLE RETAINERS

BACKGROUND OF THE INVENTION

This is an improvement in applicant's U.S. Pat. No. 3,582,030 issued June 1, 1971.

Although snap-on, pop-on, or slide-on connectors between headed pins or pegs and sockets are well known, none are known for connections between the covers of the cells of a secondary storage battery and a cable retainer for said battery.

SUMMARY OF THE INVENTION

Generally speaking, the rectangular cell covers of secondary storage batteries, preferably of the industrial type, have equally spaced from each adjacent edge near each of their corners, blind narrow-necked sockets or flared-head pegs, such as inverted trapezoids, to which sockets or pegs cooperating cable holders or retainers are snapped. These retainers comprise singular or double-sized apertures or loops through which one or two, respectively, battery connecting cables are threaded or fitted, which loops may have a slit for opening their sides for insertion of the cables. The flat or horizontal bases for these loops have on their bottom flat surfaces a pair of cooperating headed pegs or blind sockets, respectively, for snap-fitting onto the sockets or pegs on adjacent corners of said covers for each cell in a multi-cell secondary storage battery. The sockets may be cylindrical or of other shapes, or even dovetailed grooves with restricted shoulders at each end of the grooves to form central socket portions. The pegs or pins correspondingly may have rounded heads, or trapezoidal-shaped heads which slide in the dovetailed grooves and snap into their countersunk center socket portions. Since the covers have their pegs or sockets symmetrically located in each corner, the cable retainers are fitted to bridge the top edges of the walls of adjacent cells, in either orthogonal position. The aperture or loop of the retainers are so positioned that the cables retained by them extend along the top edges of the walls between the cells, so that the cables are spaced away from the terminals and filler openings on the cell covers.

BRIEF DESCRIPTION OF THE VIEWS

The above mentioned and other features, objects and advantages, and a manner of attaining them are described more specifically below by reference to embodiments of this invention shown in the accompanying drawings wherein:

FIG. I is a perspective view of part of the top of a multi-cell industrial battery showing one embodiment of the covers and cable retainers which cooperate therewith in the positions thereon;

FIG. II is a slightly enlarged side elevational view of the one cable type of retainer shown in FIG. I, bridging adjacent corners of two cell covers, which corners are shown in section through their corner sockets;

FIG. III is an end elevational view of the retainer shown in FIG. II;

FIG. IV is a slightly enlarged front elevation of a two-cable retainer of the type shown in FIG. I;

FIG. V is an end elevation of the retainer shown in FIG. IV;

FIG. VI is a perspective view of part of the top of a multi-cell industrial battery showing a plurality of cell covers according to another embodiment of this invention and their cooperating cable retainers;

FIG. VII is a slightly enlarged side elevational view of the one cable type of retainer shown in FIG. VI bridging the corners of adjacent cell covers shown in section;

FIG. VIII is an enlarged sectional view taken along line VIII—VIII of FIG. VII showing the socket portion in the groove connector;

FIG. IX is a slightly enlarged side elevational view of a two-cable retainer of the type shown in FIG. VI; and FIG. X is an end elevational view of the retainer shown in FIG. IX.

DETAILED DESCRIPTION OF PREFERRED EMBODIMENTS

Referring first to the type of battery cell covers and retainers disclosed in FIGS. I through V, the plastic battery covers therein contain the sockets at their corners and the retainers have the cooperating pegs for these sockets. In FIG. I the battery cell covers 20 are shown to be rectangular or square in plan view and have blind sockets 22 at each corner thereof spaced inwardly equal distances from both adjacent orthogonal edges. The covers 20 are preferably made of plastic and are herein shown to have central apertures with removable caps 24 for filling the secondary battery cells with liquid electrolyte. Also there is shown in FIG. I intercell connectors or bus bars 26 above the surfaces of the covers 20 for connecting terminals of adjacent cells. In this embodiment the sockets 22 as shown in FIG. II have substantially spherical bottoms and slightly restricted necks, but not so restricted that the spherical-ended pegs 32 on the bottom of each of the retainers 30, 31 can not be snapped into or out of these sockets.

The flexible plastic cable retainers 30 and 31 primarily differ from each other in the size of the loops 34 and 35, respectively, for receiving either one or two cables (see FIG. VI for cables 48). If desired, the upper flexible portions of the loops 34 and 35 may be split as shown at 39 in FIGS. I and II for the retainers 31 and 30, respectively, so that the flexible sides of their loops may be spread apart outwardly for placing the cables therein. However, the cables also may be threaded longitudinally through these loops 34 and 35 as shown for the two cable loops 31 in FIG. IV.

The rectangular bottom portions 36 of these retainers 30 and 31 comprise substantially similar rectangular parallelepipeds, which may be and preferably are hollow in the same direction as the holes in their loops 34 and 35. These rectangular hollow portions 37 not only reduce the mass of the retainers 30 and 31, but also add to the flexibility of their bottom walls 38 so that the integral pegs or pins 32 extending orthogonally below these walls 38 have some flexibility to align and fit into their cooperating sockets 22 on adjacent corners of the covers 20. These pins 32 in this embodiment are herein shown to be substantially spherical with supporting neck portions having slightly smaller diameters than those of the spherical ends of the pegs 32.

Referring now to the embodiment shown in FIG. VI through X, FIG. VI (as in FIG. I) shows a different type of plastic battery cell cover 40 for each of the adjacent cells, which covers 40 also are rectangular and have headed pins or projections 42 at their corners spaced inwardly equal distances from the orthogonal adjacent sides, instead of the sockets 22 shown in FIG.

I. These pins, pegs or projections 42 fit into socket grooves 52 in the bottom walls 58 of the flexible plastic retainers 50 and 51. There is also shown in FIG. VI caps 44 centrally of each cover 40, and bridging intercell connectors or bus bars 46, corresponding respectively to the similar elements 24 and 26 shown in FIG. I.

The upwardly projecting pegs 42 are integral with their covers 40 and are shown in this embodiment as inverted square trapezoidal pyramids so that their outward projecting portions have heads or ends larger than their inner projecting portions, and their square sides being parallel and orthogonal with the adjacent sides of the covers 40.

The retainers or cable holders 50 and 51 differ from each other in the same respect as those retainers 30 and 31 in the previous embodiment, namely with relative sizes of their loops 54 and 55 for retaining one or two cables 48 as shown in FIG. VI. Similarly, as in the previous embodiment, the lower flat horizontal portions 56 of each of the retainers 50 and 51 comprise parallelepipeds of equal size and also may be hollow 57 in the corresponding horizontal direction as the apertures forming the loops 54 and 55, respectively. These apertures 57 also add to the flexibility to the bottom horizontal portions 58 which contain herein the parallel dovetailed socketed grooves 52. These grooves 52 have offset portions forming the sockets 53 as shown more clearly in FIG. VIII intermediate their ends, so as to retain the projections 42 and prevent the easy slipping of the retainers 50 and 51 out of their cable-supporting positions on the covers 40. Furthermore, these flexible bottoms 58 enable the retainers 50 and 51 to fit more easily over the projections 42 and to compensate for any irregularities in spacing between these projections 42 between adjacent corners of the cell covers 40. Similarly, as in the former embodiment, the upward portions of the loops 54 and 55 may be longitudinally split at 59, if desired, as shown in FIGS. VI and VII, for easy access of the cables 48 into the retaining loops, if the cables are not threaded longitudinally through the loops.

The relative thicknesses of the horizontal rectangular bases 36 and 56 of the retainers 30, 31, and 50, 51 are sufficient so that their cable loops 34, 35 and 54, 55 will support the cables 48 sufficiently high above the tops of the cell covers 40 so as to extend above any of the intercell connectors 26 or 46 in the event the cables are to project transversely of these connectors 26 and 46.

It should be clearly understood that although spherical type pins 32 and correspondingly shaped sockets 22 in the cell covers 20 are employed in the embodiment shown in FIGS. I through V, these cooperating fastening pin and socket means may be reversed between the retainers 30 and 31 and the corresponding covers 20 without departing from the scope of this invention. Similarly the pins 42 and socketed grooves 52 shown in embodiment of FIGS. VI through X may correspondingly be reversed between the parts 40 and 50 and 51. Furthermore, it also should be understood that other shapes of cooperating pins and sockets may be employed for snap-fitting the cable retainers and battery cell covers together, than those specifically shown in these embodiments, without departing from the scope of this invention.

While there is described above the principles of this invention in connection with specific apparatus, it is to be clearly understood that this description is made only by way of example and not as a limitation to the scope of this invention.

I claim:

1. In a battery having a plurality of cells with rectangular covers, a removable flexible plastic cable retainer comprising: a lower supporting portion and an upper loop portion for retaining an electric conductor cable extending above said covers, the improvement in said covers and said retainers comprising:
   (A) identical snap friction-fitting means equally and symmetrically located adjacent each corner of each battery cell cover, and
   (B) an identical pair of fitting means on the underside of opposite ends of the lower portion of each cable retainer, cooperating by snap fitting with an adjacent pair of said snap friction-fitting means on adjacent corners of two adjacent cell covers.

2. A battery according to claim 1 wherein one of said fitting means is a projection and the other of said fitting means is a socket for said projection.

3. A battery according to claim 1 wherein said loop of said cable retainer is flexible and discontinuous above its supporting portion.

4. A battery according to claim 1 wherein said fitting means comprise blind cavities with narrower openings in said covers, and downwardly projecting spherical knobs on said retainers which snap-fit into said cavities.

5. A battery according to claim 1 wherein said fitting means comprise inverted square frusto-pyramidal projections on said cover, and parallel dovetailed grooves with restricting shoulders near their ends forming socket portions in said grooves on said retainer.

* * * * *

UNITED STATES PATENT AND TRADEMARK OFFICE
CERTIFICATE OF CORRECTION

PATENT NO. : 4,481,269
DATED : November 6, 1984
INVENTOR(S) : James H. Barrett, Jr.

It is certified that error appears in the above-identified patent and that said Letters Patent are hereby corrected as shown below:

On the title page;

[76], change "Gold Creed" to - - Golf Creek - - .

In the Abstract, line 4, change "inverte4d" to - - inverted - - .

Column 4, line 8, change "and" (second occurrence) to - - or - - .

Signed and Sealed this

Twentieth Day of August 1985

[SEAL]

Attest:

DONALD J. QUIGG

Attesting Officer

Acting Commissioner of Patents and Trademarks